United States Patent [19]

Schiettecatte

[11] Patent Number: 5,193,139
[45] Date of Patent: Mar. 9, 1993

[54] HOUSEHOLD COFFEEMAKER

[75] Inventor: Patrice J. C. Schiettecatte, Alencon, France

[73] Assignee: Moulinex (Societe Anonyme), Bagnolet, France

[21] Appl. No.: 674,448

[22] Filed: Mar. 25, 1991

[30] Foreign Application Priority Data

Apr. 11, 1990 [FR] France ............................. 90 04679

[51] Int. Cl.⁵ ............................................ A47J 31/54
[52] U.S. Cl. .................................. 392/480; 392/481; 99/281; 99/282; 99/283; 99/299
[58] Field of Search .................... 392/467, 480, 481; 219/501; 99/281, 282, 283, 299, 307

[56] References Cited

U.S. PATENT DOCUMENTS

| 4,208,957 | 6/1980 | Bollman et al. | 99/282 |
| 4,382,176 | 5/1983 | Wood | 219/494 |
| 4,406,217 | 9/1983 | Oota | 99/280 |
| 4,875,408 | 10/1989 | McGee | 99/283 |
| 4,920,869 | 5/1990 | Landais | 99/283 |
| 4,994,641 | 2/1991 | Schiebelhuth | 219/308 |

FOREIGN PATENT DOCUMENTS

| 0106905 | 5/1984 | European Pat. Off. | 99/283 |
| 1166988 | 4/1964 | Fed. Rep. of Germany . | |
| 2722548 | 11/1978 | Fed. Rep. of Germany . | |
| 8708083 | 9/1987 | Fed. Rep. of Germany . | |

Primary Examiner—Bruce A. Reynolds
Assistant Examiner—Michael D. Switzer
Attorney, Agent, or Firm—Young & Thompson

[57] ABSTRACT

A household coffeemaker comprises a cold water reservoir (1) supplying a water heater (2) of the circulating type whose outlet is connected to a water channel (3) of a coffee filter (4). The water heater comprises a heating resistance (7) whose supply circuit is connected to the terminals (8) of a source of alternating current. The supply circuit of the resistance (7) comprises a device (11) for changing the electric power supplied to the resistance (7) so as to supply, during a first so-called pre-steeping phase, a low power to obtain a low flow rate of hot water, and during a second so-called infusion phase, a higher power to obtain a higher flow rate of hot water. The invention is applicable to drip coffeemakers.

7 Claims, 1 Drawing Sheet

HOUSEHOLD COFFEEMAKER

FIELD OF THE INVENTION

The invention relates to household coffeemakers comprising a cold water reservoir supplying a water heater of the circulating type whose outlet is connected to a water inlet of a coffee filter disposed above a collector for the infusion, said water heater comprising a heating resistance whose supply circuit is connected to the terminals of a source of alternating current.

BACKGROUND OF THE INVENTION

In coffeemakers of this type, the resistance is supplied at constant power such that the water heater delivers as rapidly as possible hot water at a constant flow rate. Unfortunately, with such a method, one cannot obtain strong coffee having a rich flavor, because the grounds do not have time to "swell" and thus give up all their flavor.

SUMMARY OF THE INVENTION

The invention has for its object to provide a coffeemaker for producing richly flavored coffee and having a simple and inexpensive modification of the supply circuit of the heating resistance.

According to the invention, the supply circuit of the resistance comprises a device for changing the electric power supplied to said heating resistance so as to supply said resistance, during a first so-called pre-steeping phase, a low power to obtain a low flow of hot water, and during a second so-called infusion phase, a higher power to obtain a larger flow of hot water.

Thus, it will be understood that by varying the power of the resistance of the circulating water heater, there is obtained a modification of the flow rate of the water at its outlet. Thus, one can choose a low flow rate during the pre-steeping phase to swell the grounds.

BRIEF DESCRIPTION OF THE DRAWINGS

The characteristics and advantages of the invention will further appear from the description which follows, by way of example, with reference to the accompanying drawing, in which.

DETAILED DESCRIPTION OF THE INVENTION

Figure 1:
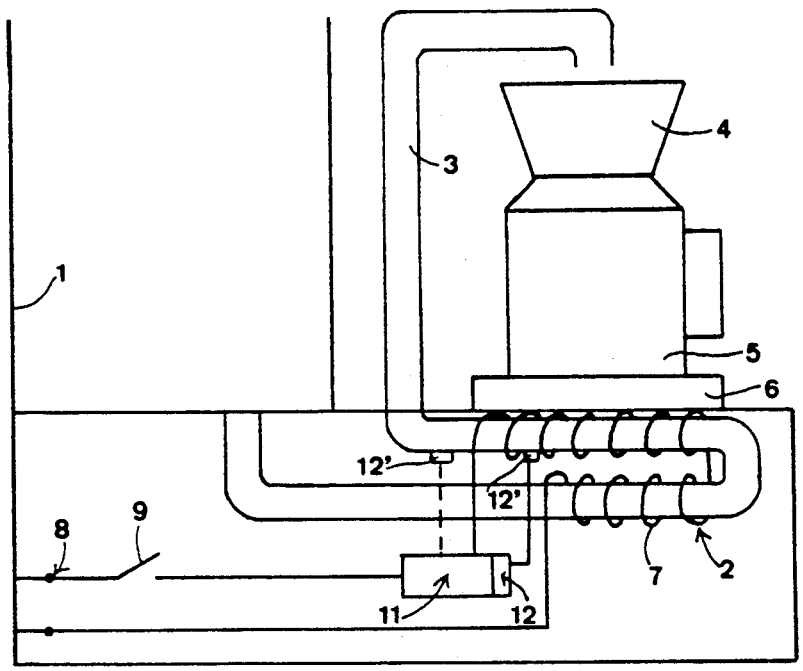
FIG. 1 is a schematic view of a coffeemaker comprising a supply circuit according to the invention.

The coffeemaker shown in FIG. 1 comprises a cold water reservoir 1 feeding a water heater 2 of the circulating type whose outlet is connected to a water inlet 3 of a coffee filter 4 disposed above a collector 5 for the infusion resting on a plate 6 secured to said water heater, said water heater comprising a heating resistance 7 whose supply circuit is connected to the terminals 8 of a source of alternating current such as an electric supply of 110 or 220 volts. The supply circuit comprises, in a manner known per se, an operating switch 9 and a thermostat 10 to regulate the temperature of the hot water, mounted in series with said heating resistance 7.

According to the invention, the supply circuit of the resistance 7 comprises a device 11 for changing the electrical power supplied to said heating resistance 7 so as to supply said resistance, during a first so-called pre-steeping phase, with low power to obtain a low hot water flow rate, and during a second so-called infusion phase, a higher power to obtain a greater flow rate of hot water.

So as to ensure automatic operation of the coffeemaker, the device for changing the power comprises a timing element 12 so as to define the pre-steeping and infusion phases.

A simple and inexpensive way to make the device for changing the power is, on the one hand, to use a diode 13 mounted in series in the supply circuit of the heating resistance 7, and, on the other hand, to connect the timing element 12 in parallel with the terminals of the diode 13, the timing element 12 being adapted to occupy either an open position in which the supply of the resistance 7 is effected through the diode 13, or a closed condition in which it shunts said diode.

Figure 2:
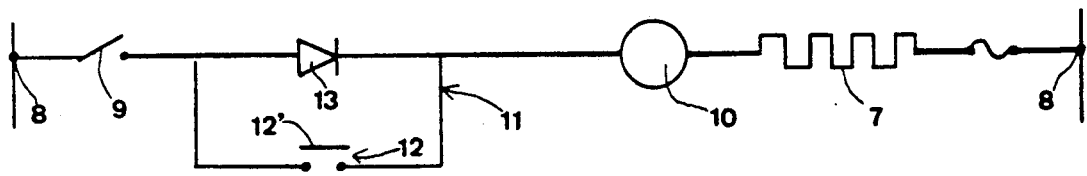
FIG. 2 is a schematic view of the electric circuit for supplying the resistance of the coffeemaker.

According to a preferred embodiment (schematically shown in FIG. 2), the timing element 12 is a switch controlled by a temperature-sensitive element 12' of the bimetallic type. Comparative tests with a switch actuated by means of an element formed of material with a shape memory have also given good results.

As shown schematically in FIG. 1, the temperature-sensitive element 12' is provided on the water heater, or even according to another arrangement, schematically shown in broken lines, disposed in the outlet of the water heater on the water supply channel.

A coffeemaker comprising such a device for changing the power operates in the following manner:

As soon as the switch 9 is closed, and because the timing element 12, whose bimetallic element is cold, occupies its open condition (FIG. 2), the supply of the heating resistance 7 is effected through the diode 13 and therefore at partial power.

In the course of this first pre-steeping phase, the flow rate of the hot water from the outlet of the water heater 2 is low and permits the grounds to swell and to macerate. The duration of this pre-steeping phase has been determined such that the timing switch 12 will pass to its closed condition at the end of two or three minutes. In this closed condition, the timing switch shunts the diode 13 and the supply of hot water is effected at full power (for example 1200 watts) accelerating and then maintaining a high flow rate of water during the infusion phase which is generally of the order of 5 to 6 minutes. At the end of this fusion phase, the regulating thermostat 10 fulfills its role and maintains the support plate 6 of the infusion collector 5 at a so-called "hold hot" temperature of the infusion.

Figure 3:
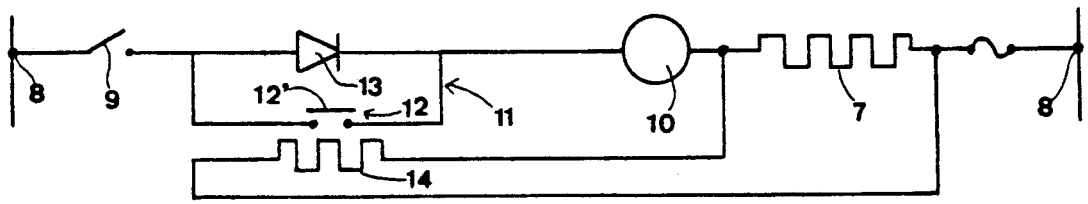
FIG. 3 is a view of a modification of the electric scheme of the supply circuit of the resistance.

According to another embodiment of the invention shown in FIG. 3, the temperature-sensitive element 12 is influenced by an auxiliary resistance 14 mounted in parallel to the terminals of the heating resistance 7.

Thus, as will be understood, each time the regulating thermostat 10 opens, the temperature-sensitive element is no longer influenced by the auxiliary resistance 14 and cools so as to impart to the timing element 12 its open condition. As soon as the regulating thermostat 10 closes, the supply of heating resistance 7 takes place through the diode 13, thus at partial power, thereby reducing without difficulty the so-called "hold-heat" temperature. Thanks to this arrangement, not only is the temperature reduced of the metallic members of the water heater 2, but also the temperature of the plastic parts of the coffeemaker, which permits avoiding a particular thermal insulation and even permits making these portions of a plastic material of low cost such as for example polypropylene.

What is claimed is:

1. In a household coffeemaker comprising a cold water reservoir (1) supplying a water heater (2) of the circulating type whose output is connected to a water channel (3) of a coffee filter (4) disposed above an infusion collector (5), and a timing element (12) that regulates the duration of an initial pre-steeping phase and a subsequent infusion stage by an open and closed condition respectively, said water heater comprising a heating resistance (7) whose supply circuit is connected to the terminals (8) of a source of alternating current; the improvement wherein said supply circuit of said heating resistance (7) comprises a device (11) for changing the electric power supplied, according to whether said timing element (12) is in said open or said closed condition, to said heating resistance (7) so as to supply said heating resistance (7), during said pre-steeping phase, with low power to obtain a low flow rate of hot water, and during said infusion phase, with greater power to obtain a greater flow rate of hot water.

2. Household coffeemaker according to claim 1, wherein said device (11) for changing the electric power supplied to said heating resistance (7) comprises a diode (13) connected in series in said supply circuit of said heating resistance (7), and said timing element (12), connected in parallel to the terminals of said diode (13), exhibits either said open condition, in which said heating resistance (7) is supplied through said diode (13) at half-power, or in said closed condition, in which said heating resistance (7) is supplied at full power, said diode (13) being shunted by said closed condition of said timing element (12).

3. Household coffeemaker according to claim 2, wherein said timing element (12) is a switch controlled by a temperature-sensitive element (12').

4. Household coffeemaker according to claim 3, wherein said temperature-sensitive element (12') is a bimetal.

5. Household coffeemker according to claim 3, wherein said temperature-sensitive element (12') is a member made from a material with shape memory.

6. Household coffeemaker according to claim 3, wherein said temperature-sensitive element (12') is provided on said water heater (2).

7. Household coffeemaker according to claim 3, wherein said temperature-sensitive element (12') is influenced by an auxiliary resistance (14) mounted in parallel to the terminals of said heating resistance (7).

* * * * *